May 13, 1930.  E. J. BABBITT  1,758,817
FISH LURE
Filed Dec. 28, 1928
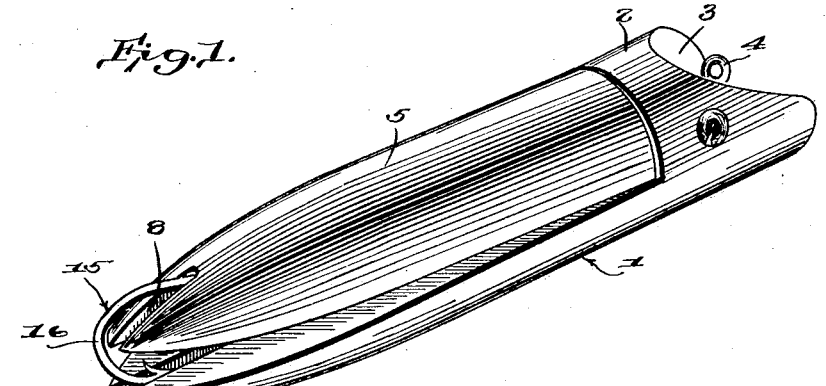
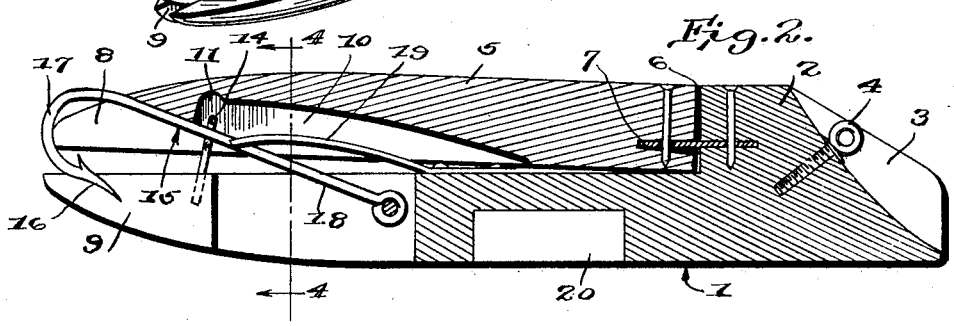
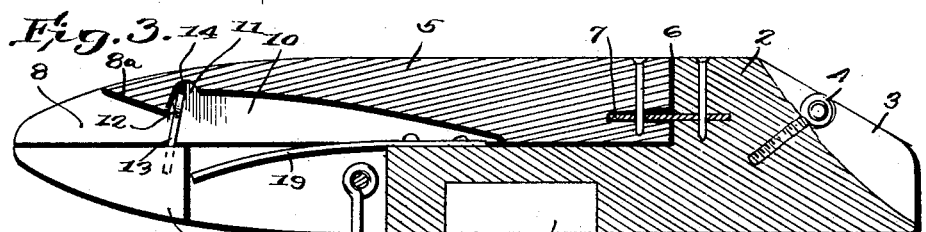
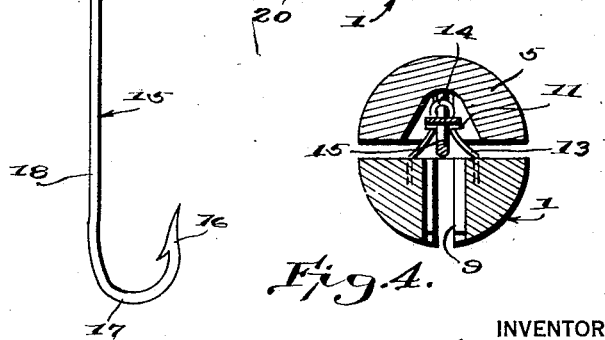
WITNESS
INVENTOR
E. J. Babbitt
BY
ATTORNEY Patented May 13, 1930

1,758,817

UNITED STATES PATENT OFFICE

ELWIN J. BABBITT, OF HOLLAND, MICHIGAN

FISH LURE

Application filed December 28, 1928. Serial No. 329,006.

This invention relates to artificial fish bait or lures for use in casting, a trolling, or still fishing.

A primary object of the invention is to construct an artificial fish bait which when grasped by the fish will automatically release a hook and project it into position so that the fish will be impaled thereon.

Another object of the invention is to so construct a bait of this character having parts movable toward and away from each other and which when pressed together by the graps of the fish in striking the bait releases the clamp which holds the hook housed within the bait and permits it to drop by gravity and also by spring pressure exerted thereon to cause it to swing out into position to engage the mouth of the fish.

Another object of the invention is to construct a bait of this character which while simple and cheap to manufacture will effectively house the hook within the bait until released by a postive grip exerted on the movable parts by the fish in swallowing or striking the bait.

Still another object is to construct such a bait with a smooth surface throughout to avoid its entanglement with weeds and the like ensuring its free passage through the water.

In carrying out these objects, the invention is susceptible of a wide range of modification without departing from the spirit or sacrificing any of the advantages of the claimed invention; there being shown in the drawings for illustrative purposes a preferred and practical form, in which:

Figure 1 represents a perspective view of a bait constructed in accordance with this invention showing the hook in housed position;

Fig. 2 is a longitudinal section thereof with the hook in housed position;

Fig. 3 is a similar view showing the hook in released position; and

Fig. 4 is a transverse section taken on the line 4—4 of Fig. 2.

In the embodiment illustrated the body 1 of the bait has the head 2 thereof made integral therewith with a recess 3 formed in the front upper portion of said head in which is mounted a screw eye 4 for connection with the line, not shown. At the rear of the head 2 the body which may be of any desired shape providing it has a smooth projectionless surface to insure a free passage through the water, has a portion 5 cut out and hingedly connected at its inner end with the base or rear end of the head. A shoulder 6 is formed at the inner end of the head 2 against which the inner end of the cut out portion 5 is designed to abut when in closed position as shown in Fig. 3. This cut out portion 5 forms a movable jaw which conforms in shape to the general contour of the body and operates with the remainder thereof which constitutes a support therefor. This jaw 5 is shown connected with the head 2 by a spring 7 which exerts its tension to normally close the jaw. The free end or tail portion of the jaw 5 and the corresponding portion of the body are slotted longitudinally as shown at 8 and 9 respectively, said slots registering with each other to permit the hook 15 to move freely therethrough. When the hook is set the pointed end 16 thereof is completely housed within the bait with the curved portion 17 which connects the point with the shank projecting beyond the bait to provide for the manipulation of the hook in setting it and to ensure its release when the bait is struck by a fish as will be presently more fully described.

The shank 18 of the hook is pivotally mounted at its end between the walls of the slot 9 in the body portion of the bait adjacent the inner end of said slot and which permits the hook when released to drop down into the position shown in Fig. 3 with the barbed portion 16 thereof entirely outside the bait so as to ensure the impalement of the fish thereby.

In the movable jaw 5 at the rear of the slot 8 is a recess 10 with a chamber 11 at its front end to receive a catch member 12 carried by the body portion and which is designed to engage and hold the hook 15 in set inoperative position as shown in Figs. 1 and 2. This catch member 12 is made substantially inverted U-shaped in form with the legs 13 thereof straddling the slot 9 in the body on the inner face of said body and with a loop 14 formed at its upper end to receive the shank of the hook, the legs 13 approaching each other at the entrance of said loop so as to form holding means for the shank 18 of the hook when in set position as is shown clearly in Figs. 2 and 4.

A spring 19, here shown in the form of a leaf spring, is attached at one end to the body of the bait on the face opposed to the jaw 5 and extends forwardly over a portion of the slot 9 in said body and has its front end notched to straddle the shank of the hook when the latter is set and to exert tension to force said hook outwardly, so that when the hook is disengaged from the loop 14 the spring will cause it to be projected outside the bait and ensure the impalement of the fish.

By arranging the registering slots 8 and 9 in the jaw and body portion of the bait the two parts are permitted to fit closely together as is shown clearly in the drawing and the inclined inner end 8ª of the slot 8 of jaw 5 forms an abutment against which the shank of the hook engages when set and which forces said jaw into open position shown in Figs. 1 and 2.

The body portion of the bait at a point intermediate its end has a weight 20 embedded therein to ensure the bait always floating right side up.

In the use of this bait the hook being shown set as in Figs. 1 and 2 with the shank engaged by the loop 14 of the catch, when a fish strikes the bait the upper portion or jaw member 5 is forced down against the back of the hook causing the shank of the hook to pass out of the loop 14 and the action of the spring 19 operates to throw the hook out of the slot in the body into the mouth of the fish where it will impale and hold the fish.

In the setting of the bait the object then is to move the jaw away from the body and to grasp the curved portion 17 of the hook and force the shank thereof into the loop 14 between the spring legs of the catch and thereby hold it with the point housed in the bait and with the spring 19 bearing on its shank ready for projecting it when released.

It will be obvious that by forming the jaw 5 to conform to the general contour of the bait body and mounting it in the manner above set forth a bait will be produced having no appreciable projections such as would be liable to engage with weeds, grass and the like and retard the movement of the bait through the water.

Without further description it is thought that the features and advantages of the invention will be readily apparent to those skilled in the art, and it will, of course, be understood that changes in the form, proportion and minor details of construction may be resorted to, without departing from the spirit of the invention or its scope as claimed.

I claim:

1. A lure comprising a body having a cut out portion terminating adjacent one end in an abutment, a section conforming to the shape and filling said cut out portion being pivotally connected at one end adjacent said abutment, said movable member and said body having longitudinally extending registering slots opening through the rear ends thereof, a substantially inverted U-shaped catch member spanning the slot in the body member with the legs thereof converging intermediate their ends to form a hook shank clamp whereby the hook is yieldably held within the lure, a spring mounted in the path of the hook to engage it when set and exert its tension in a direction to project the hook when released, said movable section having a portion engaging said hook when the latter is set whereby the sections are held separated at their free ends and adapted to force the hook outward externally of the lure when the movable jaw or section is closed.

2. A bait or lure including a body having a lengthwise slot opening through one end, a hook pivoted for swinging movement externally of the body through said slot, a jaw movable toward and away from said body over said hook, a substantially inverted U-shaped catch member spanning the slot in the body member with the legs thereof converging intermediate their ends to form a hook shank clamp whereby the hook is yieldably held within the lure, a spring mounted in the path of the hook to engage it when set and exert its tension in a direction to project the hook when released, said jaw having a portion engaging said hook when the latter is set whereby the sections are held separated at their free ends and adapted to force the hook outward externally of the lure when the movable jaw is closed.

ELWIN J. BABBITT.